(12) United States Patent
Pritchard

(10) Patent No.: US 9,783,065 B2
(45) Date of Patent: Oct. 10, 2017

(54) ENERGY STORAGE SYSTEM AND METHOD OF MAKING AND USING THE SAME

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/012,080

(22) Filed: Feb. 1, 2016

(65) Prior Publication Data

US 2016/0221448 A1    Aug. 4, 2016

Related U.S. Application Data

(60) Provisional application No. 62/111,831, filed on Feb. 4, 2015.

(51) Int. Cl.
| | | |
|---|---|---|
| *B60K 6/12* | (2006.01) | |
| *B60K 17/34* | (2006.01) | |
| *B60L 7/24* | (2006.01) | |
| *B60T 1/10* | (2006.01) | |
| *F16D 61/00* | (2006.01) | |
| *B60K 6/52* | (2007.10) | |

(52) U.S. Cl.
CPC ............... *B60L 7/24* (2013.01); *B60K 6/12* (2013.01); *B60T 1/10* (2013.01); *F16D 61/00* (2013.01); *B60K 6/52* (2013.01)

(58) Field of Classification Search
CPC ......... B60K 6/12; B60K 17/34; B60K 17/356
See application file for complete search history.

(56) References Cited

U.S. PATENT DOCUMENTS

| | | |
|---|---|---|
| 3,295,620 A | 1/1967 | Messenger |
| 4,293,061 A | 10/1981 | Brown |
| 4,320,811 A | 3/1982 | Queveau |
| 4,663,992 A | 5/1987 | Fujiura et al. |
| 4,718,311 A | 1/1988 | Hayakawa et al. |
| 5,343,970 A | 9/1994 | Severinsky |
| 5,443,429 A | 8/1995 | Baxter, Jr. |
| 5,740,877 A | 4/1998 | Sasaki |
| 6,044,922 A | 4/2000 | Field |
| 6,209,672 B1 | 4/2001 | Severinsky |
| 6,311,797 B1 | 11/2001 | Hubbard |
| 6,446,774 B2 | 9/2002 | Porter |
| 6,481,516 B1 | 11/2002 | Field et al. |
| 6,554,088 B2 | 4/2003 | Severinsky et al. |
| 6,578,685 B2 | 6/2003 | Porter |
| 6,622,837 B2 | 9/2003 | Ochab et al. |

(Continued)

FOREIGN PATENT DOCUMENTS

| | | |
|---|---|---|
| CN | 1529665 A | 9/2004 |
| CN | 1849469 A | 10/2006 |

(Continued)

*Primary Examiner* — Bryan Evans

(74) *Attorney, Agent, or Firm* — BrooksGroup

(57) ABSTRACT

A number of variations include a product comprising a transfer case comprising a hydraulic system comprising a hydraulic fluid and a hydraulic pump or hydraulic motor wherein the hydraulic system is constructed and arranged to capture energy from regenerative braking of the at least one brake of at least one drive.

20 Claims, 5 Drawing Sheets

(56) References Cited

U.S. PATENT DOCUMENTS

| | | |
|---|---|---|
| 6,629,590 B2 | 10/2003 | Ochab et al. |
| 6,668,954 B2 | 12/2003 | Field |
| 7,008,342 B2 | 3/2006 | Dyck et al. |
| 7,082,757 B2 | 8/2006 | Teslak et al. |
| 7,104,347 B2 | 9/2006 | Severinsky et al. |
| 7,107,767 B2 | 9/2006 | Frazer et al. |
| 7,146,266 B2 | 12/2006 | Teslak et al. |
| 7,147,078 B2 | 12/2006 | Teslak et al. |
| 7,147,239 B2 | 12/2006 | Teslak et al. |
| 7,232,192 B2 | 6/2007 | Teslak et al. |
| 7,237,634 B2 | 7/2007 | Severinsky et al. |
| 7,238,139 B2 | 7/2007 | Roethler et al. |
| 7,391,129 B2 | 6/2008 | Chiao et al. |
| 7,392,871 B2 | 7/2008 | Severinsky et al. |
| 7,424,924 B2 | 9/2008 | Janson |
| 7,455,134 B2 | 11/2008 | Severinsky et al. |
| 7,455,135 B2 | 11/2008 | Janson et al. |
| 7,520,353 B2 | 4/2009 | Severinsky et al. |
| 7,549,499 B2 | 6/2009 | Delaney |
| 7,559,388 B2 | 7/2009 | Severinsky et al. |
| 7,597,164 B2 | 10/2009 | Severinsky et al. |
| 7,681,676 B2 | 3/2010 | Kydd |
| 7,824,290 B1 | 11/2010 | Brookins |
| 7,828,091 B2 | 11/2010 | Wedderburn, Jr. et al. |
| 7,837,587 B2 | 11/2010 | Millar |
| 7,841,432 B2 | 11/2010 | Lynn et al. |
| 7,870,925 B2 | 1/2011 | Perakes et al. |
| 7,913,791 B2 * | 3/2011 | Rose .................. B60K 6/12 123/179.31 |
| 7,993,232 B2 | 8/2011 | Millar |
| 8,070,647 B2 | 12/2011 | Heap |
| 8,075,002 B1 | 12/2011 | Pionke et al. |
| 8,091,677 B2 | 1/2012 | Murty |
| 8,196,693 B2 | 6/2012 | Anderson |
| 8,214,097 B2 | 7/2012 | Severinsky et al. |
| 8,275,528 B2 | 9/2012 | Kresse |
| 8,360,222 B2 | 1/2013 | O'Brien, II |
| 8,371,589 B2 | 2/2013 | Bartel et al. |
| 8,571,771 B2 | 10/2013 | Kresse |
| 8,622,859 B2 | 1/2014 | Babbitt et al. |
| 8,630,761 B2 | 1/2014 | Severinsky et al. |
| 8,671,801 B2 | 3/2014 | Oki |
| 8,683,720 B2 | 4/2014 | Ault et al. |
| 8,739,953 B2 | 6/2014 | Gassmann et al. |
| 8,764,595 B1 | 7/2014 | Sugimoto |
| 8,781,661 B2 | 7/2014 | Gunther |
| 8,807,575 B2 | 8/2014 | Bartel et al. |
| 8,813,593 B2 | 8/2014 | Genise et al. |
| 2001/0035323 A1 | 11/2001 | Porter |
| 2001/0039230 A1 | 11/2001 | Severinsky et al. |
| 2002/0107101 A1 * | 8/2002 | Bowen .................. B60K 6/365 475/5 |
| 2002/0125095 A1 | 9/2002 | Ochab et al. |
| 2002/0125097 A1 | 9/2002 | Ochab et al. |
| 2002/0166746 A1 | 11/2002 | Porter |
| 2002/0179349 A1 | 12/2002 | Field |
| 2003/0103850 A1 * | 6/2003 | Szulczewski ............ B60K 6/12 417/319 |
| 2003/0217876 A1 | 11/2003 | Severinsky et al. |
| 2004/0020697 A1 | 2/2004 | Field |
| 2004/0103656 A1 | 6/2004 | Frazer et al. |
| 2005/0035601 A1 | 2/2005 | Dyck et al. |
| 2005/0116537 A1 | 6/2005 | Zalewski et al. |
| 2005/0211493 A1 | 9/2005 | Ochs |
| 2006/0000208 A1 | 1/2006 | Teslak et al. |
| 2006/0000659 A1 | 1/2006 | Teslak et al. |
| 2006/0001314 A1 | 1/2006 | Teslak et al. |
| 2006/0004507 A1 | 1/2006 | Teslak et al. |
| 2006/0004509 A1 | 1/2006 | Teslak et al. |
| 2006/0014608 A1 | 1/2006 | Mitchell et al. |
| 2006/0046894 A1 | 3/2006 | Kyle |
| 2006/0100057 A1 | 5/2006 | Severinsky et al. |
| 2006/0145482 A1 | 7/2006 | Roethler et al. |
| 2006/0148609 A1 | 7/2006 | Roethler et al. |
| 2006/0197375 A1 * | 9/2006 | Delaney .................. B60K 6/12 303/20 |
| 2006/0231304 A1 | 10/2006 | Severinsky et al. |
| 2006/0231305 A1 | 10/2006 | Severinsky et al. |
| 2006/0231306 A1 | 10/2006 | Severinsky et al. |
| 2006/0237246 A1 | 10/2006 | Severinsky et al. |
| 2006/0237247 A1 | 10/2006 | Severinsky et al. |
| 2007/0034427 A1 | 2/2007 | Janson et al. |
| 2007/0034428 A1 | 2/2007 | Janson |
| 2007/0103002 A1 | 5/2007 | Chiao et al. |
| 2007/0169970 A1 | 7/2007 | Kydd |
| 2007/0193808 A1 | 8/2007 | Perakes et al. |
| 2008/0099258 A1 | 5/2008 | Berhan |
| 2008/0146396 A1 | 6/2008 | Millar |
| 2008/0251302 A1 * | 10/2008 | Lynn .................. B60K 6/12 180/65.25 |
| 2009/0076696 A1 | 3/2009 | Perkins et al. |
| 2009/0118085 A1 | 5/2009 | Heap |
| 2009/0177345 A1 | 7/2009 | Severinsky et al. |
| 2009/0215586 A1 | 8/2009 | Kresse |
| 2009/0242289 A1 | 10/2009 | Murty |
| 2009/0301796 A1 | 12/2009 | Wedderburn, Jr. et al. |
| 2010/0038204 A1 | 2/2010 | O'Brien, II |
| 2010/0258372 A1 | 10/2010 | Anderson |
| 2011/0000721 A1 | 1/2011 | Hassett et al. |
| 2011/0004363 A1 | 1/2011 | Severinsky et al. |
| 2011/0021301 A1 | 1/2011 | Asano et al. |
| 2011/0065544 A1 | 3/2011 | Millar |
| 2011/0068566 A1 | 3/2011 | Bartel et al. |
| 2011/0079454 A1 | 4/2011 | Maguire et al. |
| 2011/0126652 A1 | 6/2011 | Genise et al. |
| 2011/0184602 A1 | 7/2011 | Severinsky et al. |
| 2011/0190971 A1 | 8/2011 | Severinsky et al. |
| 2011/0284337 A1 | 11/2011 | Gassmann et al. |
| 2011/0303048 A1 | 12/2011 | Genise |
| 2012/0077632 A1 | 3/2012 | Babbitt et al. |
| 2012/0129648 A1 | 5/2012 | Isaacs et al. |
| 2012/0187699 A1 | 7/2012 | Picchi |
| 2012/0228040 A1 | 9/2012 | Kyle |
| 2012/0234135 A1 | 9/2012 | Oki |
| 2012/0296538 A1 | 11/2012 | Kresse |
| 2012/0324767 A1 | 12/2012 | Ault et al. |
| 2012/0325573 A1 | 12/2012 | Miller |
| 2013/0096752 A1 | 4/2013 | Severinsky et al. |
| 2013/0096753 A1 | 4/2013 | Severinsky et al. |
| 2013/0160722 A1 | 6/2013 | Kyle |
| 2013/0168165 A1 | 7/2013 | Bartel et al. |
| 2013/0237360 A1 | 9/2013 | DeLucia et al. |
| 2013/0325207 A1 | 12/2013 | Gunther |
| 2014/0131124 A1 | 5/2014 | Severinsky et al. |
| 2014/0162825 A1 | 6/2014 | Sugimoto |
| 2014/0171259 A1 | 6/2014 | Genise |
| 2014/0171260 A1 | 6/2014 | Dalum |
| 2014/0195078 A1 | 7/2014 | Severinsky et al. |
| 2014/0210184 A1 | 7/2014 | Ault et al. |

FOREIGN PATENT DOCUMENTS

| | | |
|---|---|---|
| CN | 100368223 C | 2/2008 |
| CN | 100497997 C | 6/2009 |
| CN | 101980883 A | 2/2011 |
| CN | 102741078 A | 10/2012 |
| CN | 102802996 A | 11/2012 |
| CN | 103118886 A | 5/2013 |
| CN | 103189225 A | 7/2013 |
| DE | 69922221 T8 | 8/2006 |
| EP | 1113943 B1 | 11/2004 |
| EP | 1522450 A2 | 4/2005 |
| EP | 1522450 A3 | 6/2005 |
| EP | 1538039 A1 | 6/2005 |
| EP | 1470014 B1 | 4/2006 |
| EP | 1932704 A2 | 6/2008 |
| EP | 2055591 A2 | 5/2009 |
| EP | 2127980 A1 | 12/2009 |
| EP | 2289750 A1 | 3/2011 |
| EP | 2500224 A1 | 9/2012 |
| EP | 2639091 A1 | 9/2013 |
| EP | 2767734 A1 | 8/2014 |
| GB | 2415669 A | 1/2006 |

(56) References Cited

FOREIGN PATENT DOCUMENTS

| | | |
|---|---|---|
| GB | 2415670 A | 1/2006 |
| GB | 2415671 A | 1/2006 |
| GB | 2415757 A | 1/2006 |
| GB | 2415758 A | 1/2006 |
| GB | 2452821 A | 3/2009 |
| GB | 2508463 A | 6/2014 |
| GB | 2508690 A | 6/2014 |
| GB | 2508951 A | 6/2014 |
| IN | 2005017390 A1 | 3/2006 |
| IN | 233273 | 5/2007 |
| IN | 227907 B | 6/2009 |
| IN | 1319KOLNP2012 | 5/2012 |
| JP | 3676235 B2 | 7/2005 |
| JP | 4370096 B2 | 11/2009 |
| WO | 9323263 A1 | 11/1993 |
| WO | 9601193 A1 | 1/1996 |
| WO | 0015455 A2 | 3/2000 |
| WO | 0240891 A2 | 5/2002 |
| WO | 0243980 A2 | 6/2002 |
| WO | 02078987 A2 | 10/2002 |
| WO | 2005017390 A1 | 2/2005 |
| WO | 2006055978 A1 | 5/2006 |
| WO | 2007035670 A2 | 3/2007 |
| WO | 2007132241 A1 | 11/2007 |
| WO | 2008018880 A1 | 2/2008 |
| WO | 2008018885 A1 | 2/2008 |
| WO | 2008076226 A1 | 6/2008 |
| WO | 2008133805 A2 | 11/2008 |
| WO | 2009120463 A2 | 10/2009 |
| WO | 2010065476 A2 | 6/2010 |
| WO | 2010065476 A9 | 6/2010 |
| WO | 2010144753 A1 | 12/2010 |
| WO | 2011011779 A1 | 1/2011 |
| WO | 2011064660 A1 | 6/2011 |
| WO | 2011109013 A1 | 9/2011 |
| WO | 2011154823 | 12/2011 |
| WO | 2012058409 A1 | 5/2012 |
| WO | 2013113103 A1 | 8/2013 |
| WO | 2013155451 A1 | 10/2013 |
| WO | 2014027109 A1 | 2/2014 |
| WO | 2014037536 A1 | 3/2014 |
| WO | 2014037536 A9 | 3/2014 |
| WO | 2014037540 A1 | 3/2014 |
| WO | 2014055013 A1 | 4/2014 |
| WO | 2014055014 A1 | 4/2014 |

* cited by examiner

ENERGY STORAGE SYSTEM AND METHOD OF MAKING AND USING THE SAME

CROSS-REFERENCE TO RELATED APPLICATIONS

This application claims the benefit of U.S. Provisional Application No. 62/111,831 filed Feb. 4, 2015.

TECHNICAL FIELD

The field to which the disclosure generally relates to includes energy storage systems and methods of making and using the same.

BACKGROUND

Currently, some energy storage systems may be used to take energy from a fluid and convert it into useful work on a system or product.

SUMMARY OF ILLUSTRATIVE VARIATIONS

A number of variations may include a product including a transfer case including a hydraulic system including a hydraulic fluid and a hydraulic pump or hydraulic motor wherein the hydraulic system is constructed and arranged to capture energy from regenerative braking of the at least one brake of at least one drive.

A number of variations may include a method including providing a transfer case including a hydraulic system including a hydraulic fluid and a hydraulic pump or hydraulic motor wherein the hydraulic system is constructed and arranged to capture energy from regenerative braking of the at least one brake of at least one drive; and operating the hydraulic system to capture energy from regenerative braking of the at least one brake of at least one drive.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
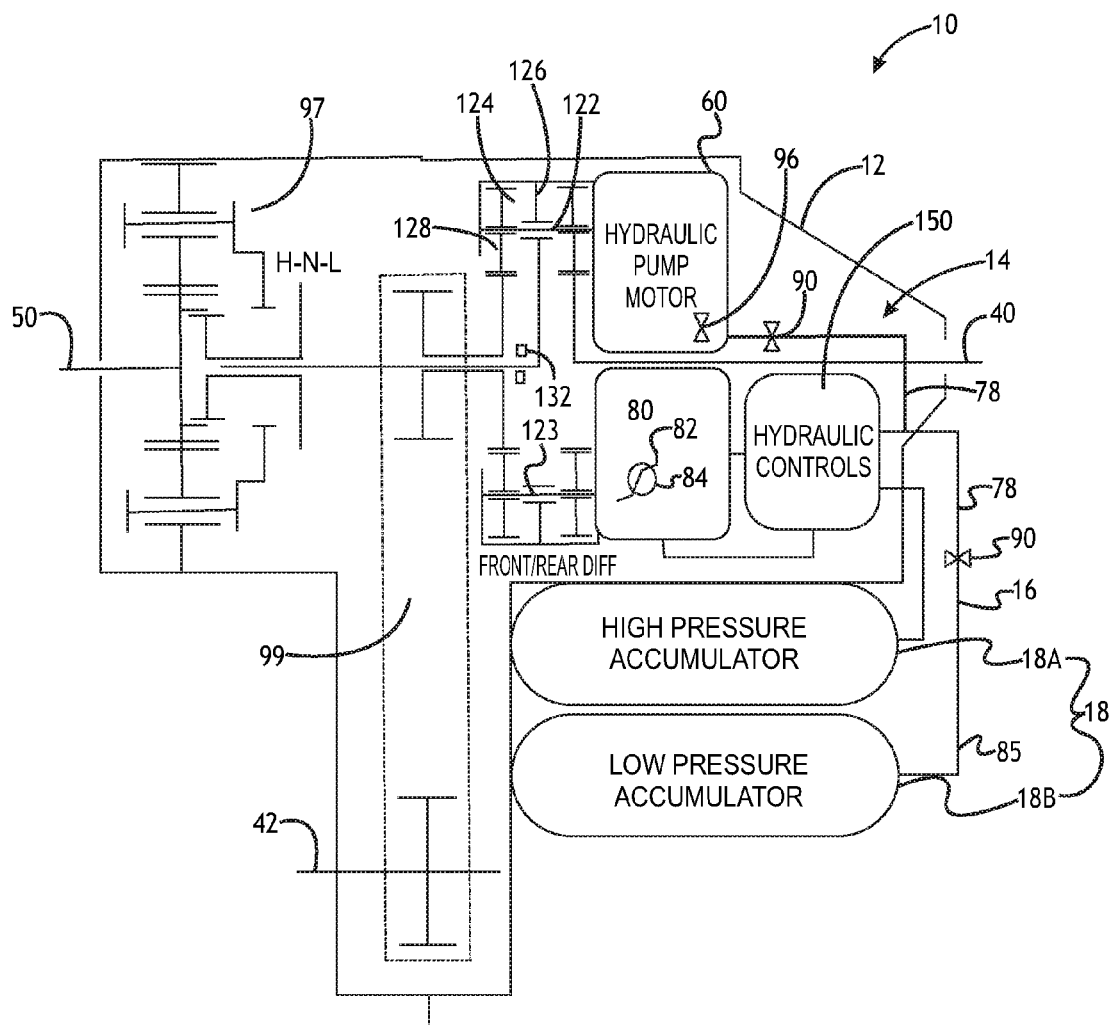
FIG. 1 is an illustration of a product according to a number of variations.

A product 10 is shown in FIG. 1 according to a number of variations. In a number of variations, the product 10 may include a transfer case 12. In a number of variations, the transfer case 12 may include at least a part of a hydraulic system 14. In a number of variations, the hydraulic system 14 may include at least one hydraulic fluid 16. In a number of variations, the hydraulic fluid 16 may flow through a plurality of fluid lines 78 and may include at least one of ATF, steam, fluorinol, ammonia, ethanol, methanol, kerosene, gasoline, diesel, propanol, butanol, water, benzene, toluene, methane, ethane, propane, butane, acetone, ethylene glycol, or liquid hydrogen. In a number of variations, the fluid 16 may be at a temperature between about 40 to about 120° C. In a number of variations, at least one of the hydraulic system 14 or transfer case 12 may include at least one of a hydraulic pump or hydraulic motor 60. In a number of variations, at least one of the hydraulic system 14 or transfer case 12 may include at least one accumulator 18. In a number of variations, the accumulator 18 may be bladder or piston spring type or may be another type. In a number of variations, at least one of the hydraulic system 14 or transfer case 12 may include at least one electronic control unit (ECU) or hydraulic system controller 150. In a number of variations, the hydraulic system 14 may be constructed and arranged to capture energy from regenerative braking of the at least one brake 38 of at least one drive 30. In a number of variations, the product 10 may be a vehicle or a component of a vehicle. In a number of variations, the vehicle may include, but not limited to, a bicycle, a motor vehicle (including, but not limited to, buses, automobiles, motorcycles, or recreational vehicles), a spacecraft, a watercraft, an aircraft, or a train. In a number of variations, the vehicle 10 may be a hydraulic hybrid vehicle. In a number of variations, the vehicle may be a four-wheel drive, rear-wheel drive, all-wheel drive, or front wheel drive vehicle.

Figure 2:
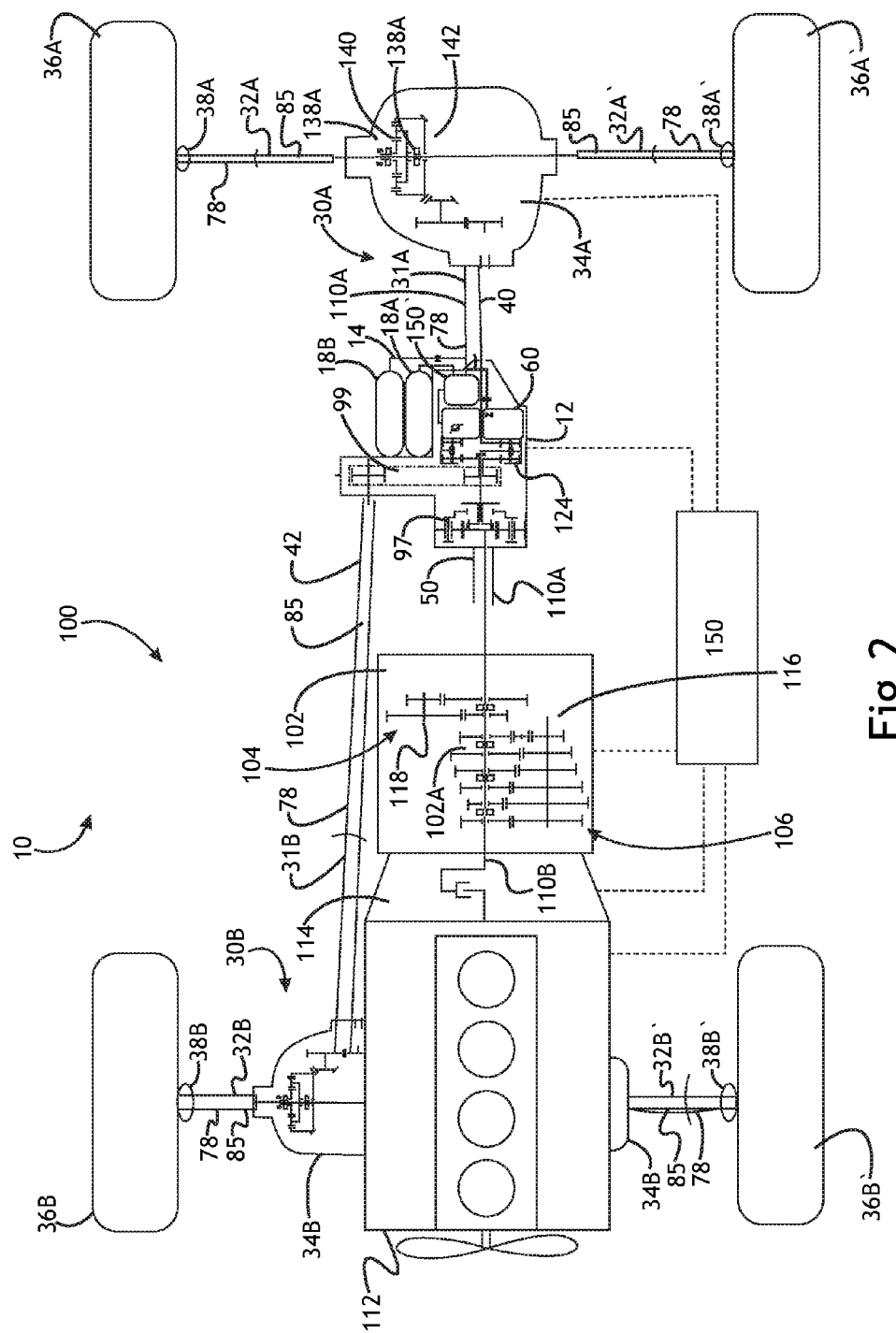
FIG. 2 is an illustration of a product according to a number of variations.

Referring to FIG. 2, in a number of variations, the vehicle 10 may include a drivetrain 100. In a number of variations, the drivetrain 100 may connect to a power source 112. In a number of variations, the power source 112 may include an internal combustion engine. In a number of variations, the power source 112 may be driveably connected to a transmission 102 through a transmission input shaft 110b. In a number of variations, the transmission input shaft 110b may transfer power through torque from the power source 112 to the transmission 102. In a number of variations, the transmission 102 may be an automatic or automated manual transmission. In a number of variations, the transmission 102 may have a chain drive, belt drive, or traction drive mechanism.

In a number of variations, the transmission 102 may include a first auxiliary gear set 104. In a number of variations, the auxiliary gear set 104 may be fixed directly to an end of the primary gear set 106. In a number of variations, the gear sets 104, 106 may include selectively engage gears. In a number of variations, the primary gear set 106 may be connected to the transmission input shaft 110b and may be selectively connectable to the power source 112 through a main or master clutch 114. In a number of variations, the main clutch 114 may be a plate-type clutch, dry clutch, or other type of clutch device, as required or desired for a particular application. In a number of variations, a countershaft 116 may be used to drive auxiliary equipment of the vehicle 10. In a number of variations, the primary gear set 106 may provide a plurality of selectable forward drive gear ratios and at least one reverse gear drive ratio. In a number of variations, a plurality of clutches 102a may be used for selectively engaging any of the desired gears in the gear sets 104, 106. In a number of variations, a headset of meshed gears may provide driving engagement between the transmission input shaft 110*b* and a countershaft 116. In a number of variations, the transmission 102 may have a transmission output shaft 110*a* which may connect at least one of the power source 112 or the transmission 102 to a transfer case 12 and may transmit torque to the transfer case 12. In a number of variations, the transmission output shaft 110*a* may be a transfer case input member 50 allowing for the transfer case 102 to be driven by an output shaft 110*b* of at least one power source 112 or engine. In a number of variations, gears in the transmission output shaft 110*a* may mash with gears in the countershaft 116, which may be used for shifting gears in the transmission 102. In a number of variations, slidable dog clutches may be used to fix gears to the output shaft 110*a* on which they may be disposed which may achieve targeted gear ratio. In a number of variations, the auxiliary gear set 104 may be coupled to the primary gear set 106 by the output shaft 110*a*. In a number of variations, the auxiliary gear set 104 may have a countershaft 118 for shifting gears and/or driving auxiliary equipment. In a number of variations, the transmission input shaft 110*b* may operatively connect to the transmission output shaft 110*a* and transfer case input member 50. In a number of variations, the transmission input shaft 110*b* may be the same component as the transmission output shaft 110*a*.

In a number of variations, the transmission output shaft 110*a* may be an input member 50 of a transfer case 12. In a number of variations, the transfer case 12 may include a first output member 40. In a number of variations, the transfer case 12 may include a second output member 42. In a number of variations, the first output member 40 may be driveably connected to at least one drive 30 including at least one of at least one driveshaft 31, at least one axle shaft 32, or at least one differential mechanism 34. In a number of variations, the at least one drive 30 may further include at least one wheel 36 and at least one brake 38. In a number of variations, the at least one drive 30 may include a first drive 30A and a second drive 30B. In a number of variations, the first drive 30A may include at least one of at least one driveshaft 31A, at least one axle shaft 32A, at least one differential mechanism 34A, at least one wheel 36A, or at least one brake 38A. In a number of variations, the second drive 30B may include at least one of at least one driveshaft 31B, at least one axle shaft 32B, at least one differential mechanism 34B, at least one wheel 36B, or at least one brake 38B. In a number of variations, the first output member 40 may be operatively connected to the first drive 30A. In a number of variations, the second output member 42 may be operatively connected to the second drive 30B. In a number of variations, the transmission output shaft 110*a* or input member 50 may be driveably connected to the first drive 30A through the transfer case 102 and via the first output member 40. In a number of variations, the transmission output shaft 110*a* or input member 50 may be driveably connected to the second drive 30B through the transfer case 102 and via the second output member 42. In a number of variations, the transmission output shaft 110*a* or input member 50 and the first output member 40 may be the same component. In a number of variations, the transfer case 12 may selectively transfer a portion of torque from the transmission output shaft 110*a* or input member 50 to the second drive 30B. In a number of variations, the transfer case 12 may operate this transfer of torque through a torque transfer unit 99 as known by a skilled artisan. In a number of variations, this torque transfer unit or center differential 99 which may include at least one of a front-rear differential, viscous coupling unit, gear set, drive chain and sprocket combination, or any other mechanism known in the art. In a number of variations, the vehicle can operate in rear wheel drive, all-wheel drive, or four-wheel drive modes. In a number of variations, the transfer case 12 may be an M.S.O.F. or E.S.O.F. shift type. In a number of variations, the transfer case 12 may include a multiple-ratio gear set 97 which may include a plurality of additional gears allowing for hi range, neutral or low range operation of the vehicle 10 as known by a skilled artisan.

In a number of variations, the vehicle 10 or transfer case 12 may further include the hydraulic system 14. In a number of variations, the hydraulic system 14 may include a hydraulic system input shaft 122. In a number of variations, the input shaft 122 may run parallel to the first output member 40. In a number of variations, the input shaft 122 may operatively connect to at least one of the first output member 40 or second output member 42 through a transfer gear set 124. In a number of variations, the transfer gear set 124 may include a first transfer gear 126. In a number of variations, the transfer gear set may include a second transfer gear 128. In a number of variations, any known arrangement for transferring speed and torque between parallel shafts can be employed in place of the transfer gear set 124, including, but not limited to, more complicated gear sets, or a sprocket and chain combination, potentially in combination with other fixed ratio mechanisms. In a number of variations, the first transfer gear 126 may be located on the transmission output shaft 110*a* or input member 50 and may be connected to the hydraulic system input shaft 122 by another gear set, drive chain and sprocket combination, or any other mechanism known in the art. In a number of variations, the first transfer gear 126 may be directly driveably connected to input shaft 122 of the hydraulic system 14. In a number of variations, the first transfer gear 126 may be engaged with a transfer case clutch 132. In a number of variations, the transfer case clutch 132 may coaxial with first transfer gear 126 and may selectively connect the first transfer gear 126 to the transmission output shaft 110*a* or input member 50. In a number of variations, the transfer case clutch 132 may provide a selective driving connection between transmission output shaft 110*a* and the hydraulic system input shaft 122. In a number of variations, the transfer case clutch 132 may be a slider or dog-tooth type clutch. In a number of variations, the transfer case clutch 132 may also be a plate type clutch. In a number of variations, the transfer case clutch 132 may be controlled by any mechanism suitable for axially displacing a clutch sleeve. Such mechanisms are well known in the art of transmissions, and include pneumatically, hydraulically and electrically actuated shift forks. Schemes for direct displacement through electromagnetic means are also known in the art. In a number of variations, the hydraulic system input shaft 122 may operatively connect to the second output member 42 through the transfer gear set 124.

In a number of variations, the transfer case 12 may further include an electrical storage system 80. In a number of variations, the electrical storage system 80 may include at least one of an electric generator 82 or an electric battery 84. In a number of variations, the electrical storage system 80 may be operatively connected to at least one of the first output member 40, the input member 50, or the second output member 42 through an electrical storage system input shaft 123. In a number of variations, the electrical storage system 80 may be operated to include kinetic energy from the brakes 38 through the hydraulic fluid 14 in production of electricity in the electric generator 82 which may then be stored in the battery 84. In a number of variations, the electricity of the battery 84 may then be used to power various vehicle 10 components including components in the transmission 102, the transfer case 102, the drive 30, the cabin heater (not shown), the exhaust system (not shown), the ECU 150, or may power another vehicle 10 component.

Figure 3:
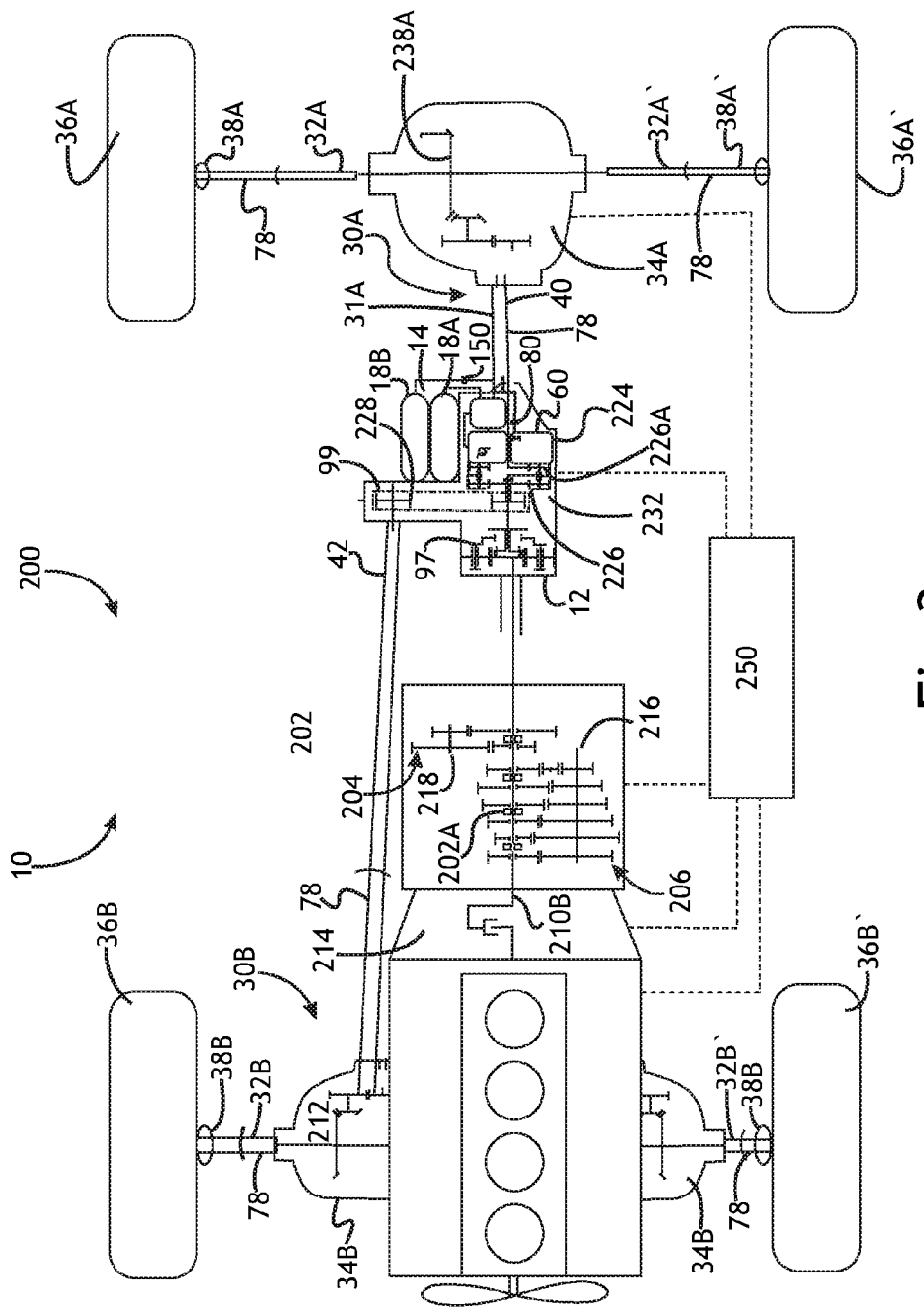
FIG. 3 is an illustration of a product according to a number of variations.

In a number of variations, at least one of the first drive 30A or the second drive 30B may also include a torque transfer arrangement, embodied in a multiple-ratio axle or differential mechanism 34 connected to the output member 40 or second output member 42. In a number of variations, the multiple-ratio axle or differential mechanism 34 may include a high ratio gear 140, a low ratio gear 142, and respective clutches 138 a to selectively engage the gears 140, 142 to transfer torque from the output member 40, 42 to the at least one vehicle drive axle 32A, B. In a number of variations, the high ratio gear 140 may provide higher torque and lower speed to the vehicle axle, while the low ratio gear 142 may provide lower torque and higher speed. In a number of variations, the multiple-ratio axle 138 may improve the launching ability of the vehicle 10. In a number of variations, as shown in FIG. 3, the multiple-ratio axle or differential mechanism 34 may be replaced by a multiple ratio gearbox which may include a single speed differential 138 that may include only one gear wherein the transfer case 12 further includes a modified gear set 224 that may include an additional transfer gear 226a having a different ratio than first transfer gear 226. In that regard, two different gear ratios may still be available to the alternative hybrid drivetrain 200, even in the absence of a multiple-ratio differential. In a number of variations, a multiple-ratio axle and a multiple-ratio gearbox may be utilized together. In a number of variations, the modified gear set 224 may include outputs 40, 42 to the first drive 30A and second drive 30B respectively for operation of the wheels in a four-wheel drive or all-wheel drive mode.

Referring again to FIG. 1, in a number of variations, the transfer case 12 may be a four wheel drive or all-wheel drive unit with a center differential 99. In the hydraulic system 14 may include a hydraulic pump or hydraulic motor 60. In a number of variations, the hydraulic pump motor 60 may be a radial, variable displacement piston design. In a number of variations, the center differential 99 may be operatively connected to the hydraulic motor 60 through the transfer gear set 124. In a number of variations, the hydraulic pump/motor 60 having a variable volumetric displacement and may be continually driveably connected to at least one of the transmission output shaft 110a, hydraulic input shaft 122, input member 50, first drive 30A or second drive 30B. In a number of variations, torque may be transmitted in a positive torque directional sense or from the power source 112 to the at least one drive 30, where the power source 112 may drive the pump/motor 60 through the transmission 102 and output shaft 110a via the transfer gear set 124 and hydraulic system input shaft 122. In a number of variations, when torque is transmitted in the negative torque direction, from the at least one drive 30 to the power source 112, the wheels 34 may drive the pump/motor 60 through the drive 30 and the output member 40 through the transfer gear set 124 and hydraulic input shaft 122. In a number of variations, a dog clutch 132 located in the transfer case 12 may produce a releasable drive connection between the pump/motor 60 and the at least one drive 30.

In a number of variations, the transfer case 12, hydraulic system 14, or vehicle 10 may further include at least one accumulator 18. In a number of variations, when accelerating the vehicle 10, high pressure fluid 16 in the accumulator 18 may drive the pump/motor 60 and the wheels 34 may be driven by rotation of the pump/motor 60, which may operate them as a fluid motor. In a number of variations, the accumulator 18 containing hydraulic fluid 16 at relative high pressure may be connected through valves 90 and fluid lines 78 to the pump motor 60. In a number of variations, the at least one accumulator 18 may include at least one of a high pressure accumulator 18A or a low pressure accumulator 18B. In a number of variations, the high pressure accumulator 18A may contain hydraulic or pneumatic fluid 16 at relative high pressure and may be connected through valves 90 and fluid lines 78 to the pump motor 60. In a number of variations, the fluid lines 78 may connect at least one of the pump motor 60, low pressure accumulator 18B, or high pressure accumulator 18A to the fluid 16 storage in the brake mechanism 38. In a number of variations, the low pressure accumulator 18B may contain hydraulic or pneumatic fluid 16 at relative low pressure and may be connected through valves 90 and fluid lines 78 to the pump motor 60. In a number of variations, the hydraulic system 14 may have multiple modes of operation. In a number of variations, in a "regeneration" mode, torque may be applied to the input shaft 122 of the hydraulic system 14 and pump/motor 60 with the pump/motor 60 operating in a "pump" mode. In the pump mode, the pump/motor 60 may draw hydraulic fluid from the low pressure accumulator 18B and force it into the high pressure accumulator 18A where it may be retained under significant pressure where the vehicle 10 may be driven as a result of such pressure as known in a hydraulic hybrid vehicle. In a number of variations, the "regeneration" mode may occur when the vehicle is decelerating or slowing wherein the vehicle 10 is recovering kinetic energy in the form of pressurized hydraulic fluid contained in the at least one accumulator 18 or the high pressure accumulator 18A wherein the pump or motor 60 may pump fluid 16 from the low pressure accumulator 18B to the high pressure accumulator 18A. In a number of variations, the at least one wheel 36 may drive the pump/motor 60 through the drive 30, and the pump/motor 60 may pump fluid 16 from low pressure accumulator 18B across a pressure differential between the pump 60 inlet, which communicates with low pressure accumulator 18B, and the pump outlet, which may communicate with the high pressure accumulator 18A. In a number of variations, fluid entering the high pressure accumulator 18A may compresses a fluid contained in a bladder in the accumulator 18, and the high pressure accumulator 18a may become pressurized to operate the vehicle 10. In a number of variations, in a "driving" mode of the hydraulic system 14, the pump/motor 60 may operate in a "motor" mode. In a number of variations, in a motor mode, pressurized fluid from the high pressure accumulator 18A may act on pump/motor 60 to induce a torque on input shaft 122, thus causing the input shaft 122 to rotate which may cause rotation of the at least one drive 30. In a number of variations, as shown in FIG. 1, the input shaft 122 may be same component as the input member 50 and first output member 40. In a number of variations, fluid 16 exiting pump/motor unit 60 may enter low pressure accumulator 18B and be pumped back to the brakes 32 via fluid lines 78 connecting the brakes 32 and wheels 36 to the pump/motor 60 of the hydraulic system 12. In a number of variations, torque may be transferred to the output shaft 110a or first output 40, via the transfer case 12. In a number of variations, this driving mode may occur when the vehicle is starting from a stopped position or otherwise accelerating. In a number of variations, the transfer case 12 includes a transfer gear 126 to both transfer energy to the first drive 30A or second drive 30B (during launching and shifting), as well as to capture energy from the transmission 102 (during deceleration and braking).

In a number of variations, control of the vehicle 10 or hydraulic system 12, may be accomplished via an electronic control unit (ECU) 150 with embedded control code. In a number of variations, the ECU 150' may be internal to the transfer case 12. In a number of variations, the ECU 150 electrically commands at least one valve 90 controlling fluid 14 in the system 12, as well as external devices such as the vehicle engine 112. In a number of variations, pump/motor 60 rotational speed, fluid pressure, torque, or other sensors located throughout the vehicle 10 communicate with the ECU 150 to help control the hydraulic system 12. In a number of variations, the embedded control logic selects the appropriate transmission gear ratio and axle ratio for any of the components in the transmission 102, axle 34, or transfer case 12, based on the determined output torque requirement and the torque available from the hydraulic system 12.

In a number of variations, when a brake pedal is applied in a vehicle 10, the vehicle 10 may decelerate due to friction braking, i.e., frictional contact of brake pads or brake shoes on wheel brake rotors or drums. In a number of variations, the force of the vehicle operator on the brake pedal may produce an electronic signal through a brake pedal transducer as an input to the ECU 150 as a variable for execution of the hydraulic system 12. In a number of variations, the ECU 150 may receive input signals from the vehicle 10 or the hydraulic system 12 including sensors 85 measuring volumetric displacement of the pump/motor 60, fluid 16 temperature, fluid 16 pressure, displacement of an accelerator pedal or brake pedal, or various inputs produced by the vehicle operator and powertrain system inputs. In a number of variations, the ECU 150 may issue command signals, received by hydraulic control valves 90 of the hydraulic system 14 causing the valves 90 to produce various system operating modes and transitions among those modes. In a number of variations, the valves 90 may be solenoid operated. In a number of variations, the valve 190 may be at least one of a ball valve, a butterfly valve, a ceramic disc valve, a check valve, a choke valve, a diaphragm valve, a gate valve, a globe valve, a knife valve, a needle valve, a pinch valve, a piston valve, a plug valve, a poppet valve, a spool valve, a thermal expansion valve, a pressure reducing valve, a sampling valve, a safety valve, or may be another type. In a number of variations, pressure on the brake pedal may change the operating modes in the hydraulic system 12 and hydraulic pump or motor 50 between a "pump" mode and a "motor" mode depending on signals from the ECU 150. In a number of variations, a swashplate control valve 96, also called a proportional valve, may change the variable displacement of the pump/motor 60 in response to commands issued by ECU 150. In a number of variations, the entirety of the hydraulic system 14 may be located inside the transfer case 12. In a number of variations, at least one of the at least one accumulator 18, hydraulic pump/motor 60, ECU 150, or hydraulic fluid, or combinations thereof may be located inside the transfer case 12. In a number of variations, placing the hydraulic system 14 at least in part in the transfer case 12 may allow for braking energy to be generated from the hydraulic fluid 16 from all four wheels 34. In a number of variations, the high pressure accumulator could perform work by passing a fluid 16 through other vehicle 10 components such as, but not limited to, power steering, braking, exhaust heat electrical generation, or may be used in another component. In a number of variations, at least one hydraulic system 14 may be placed on at least one of the axle shafts 32 of the drives 30 to accumulate hydraulic energy from at least one brake 38 to be routed to various vehicle components including, but not limited to, the power source 112, transmission 102, transfer case 12, wheels 36, or another component. In a number of variations, incorporation of the hydraulic system 14 at least in part within the transfer case 12 may allow for ease of restructure of existing vehicles to use the hydraulic system 14 and may aid in cost benefit of incorporation or manufacturing of vehicles. In a number of variations, this may allow the hydraulic system 14 to siphon energy from the brakes of all four wheels.

Figure 4:
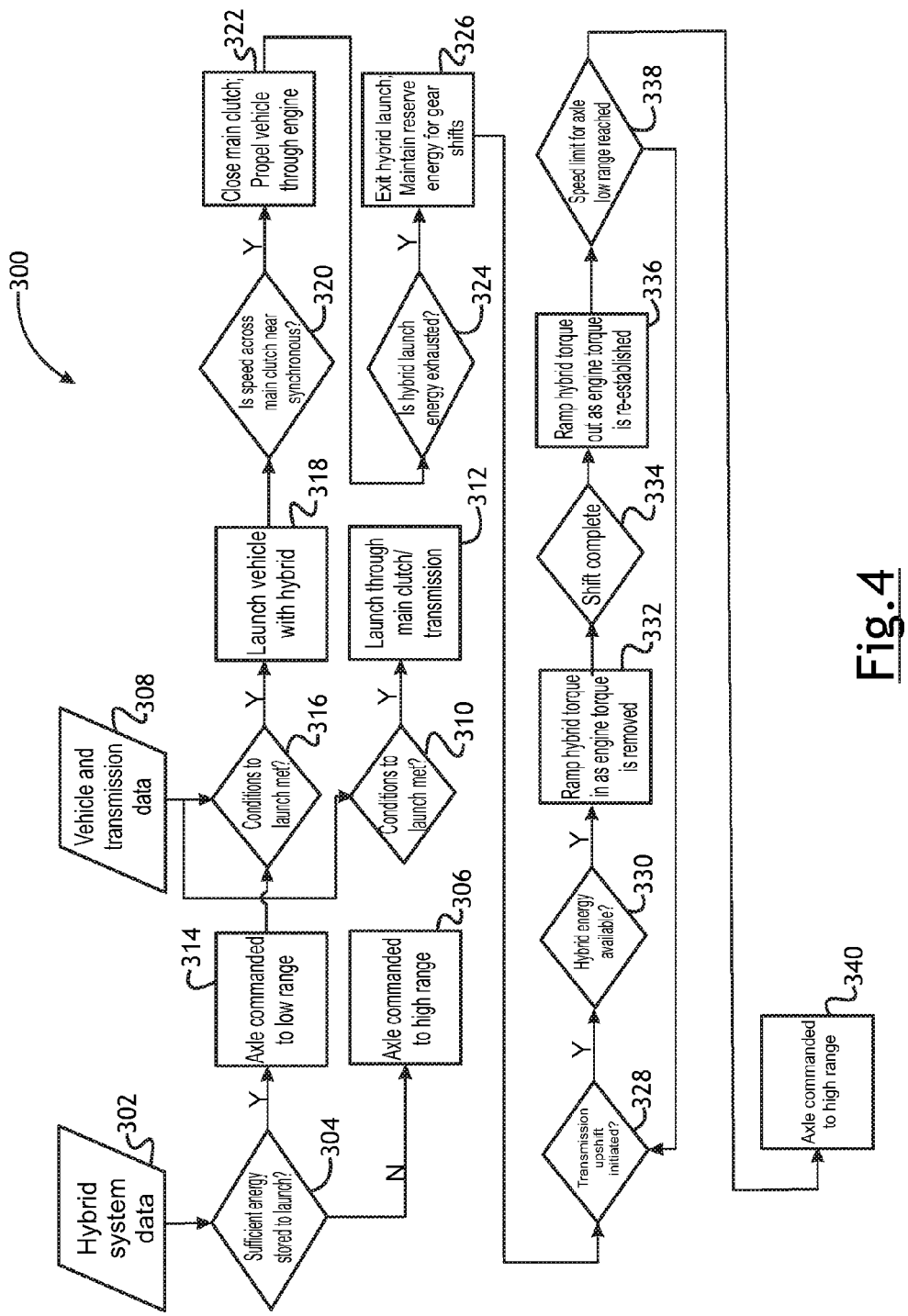
FIG. 4 is an illustration of a product and method according to a number of variations.

In a number of variations, FIG. 4 depicts a control logic sequence for a hybrid drivetrain 300. In a number of variations, the hydraulic system 14 data may first be processed by the ECU (Step 302). In a number of variations, this system data may be collected from the various sensors 85 that may be utilized throughout the vehicle 10 and drivetrain 300. In a number of variations, thereafter, the ECU 150 software may determine whether there is sufficient energy stored in the accumulator 18 to launch the vehicle 10 (Step 304). In a number of variations, if not, the differential axle may be commanded to the high range (Step 306) and additional vehicle 10 and transmission 102 data may be collected from the sensors 85 (Step 308). Of course, if the drivetrain includes the multiple-ratio gear set 97 in the transfer case 12, (as depicted in FIGS. 1 and 3) the gear set may be commanded to the high range. In a number of variations, the system next may determine if launch conditions are met. In a number of variations, this may simply require a signal from vehicular sensors 85 that the driver has released the brake and pressed the gas pedal. In a number of variations, other signals, such as failure codes or diagnostics, indicative of launch conditions may be contemplated. In a number of variations, once the conditions to launch are met (Step 310), the drivetrain 300 may launch the vehicle 10 via the main clutch 114 and transmission 102 only (Step 312). In a number of variations, failure to meet the required launch conditions may result in a failure indication being sent to the driver. In a number of variations, once launched via the transmission 102 and main clutch 114, the ECU 150 may operate as a standard (i.e., non-hybrid) AMT, assuming a critical failure of the hydraulic system 14. In a number of variations, the ECU 150 may proceed to Step 328 and utilize the hydraulic system 14 during a shift sequence. In a number of variations, the hydraulic system 14 may operate as a non-hybrid AMT until sufficient energy may be gained in the hydraulic system 14 (e.g., due to deceleration of the vehicle).

In a number of variations, returning to Step 304, if sufficient energy is stored in the accumulator 18 to launch the vehicle, the differential axle 34 may be commanded to the low range (Step 314). In a number of variations, additional vehicle and transmission data may again be collected (Step 308) and the ECU 150 may confirm that conditions to launch are met (Step 316). In a number of variations, if the conditions are met, the vehicle may be launched solely with the hydraulic system 14 (i.e., via the energy stored in the high pressure accumulator 18A) (Step 318). In a number of variations, the control system may then determine if the speed across the main clutch 114 is near synchronous (Step 320). In a number of variations, if so, the main clutch may be engaged so as to propel the vehicle under engine 112 power (Step 322). In a number of variations, the ECU 150 may continue to monitor the hydraulic system 14 to determine if launch energy is exhausted (Step 324). In a number of variations, this monitoring may include detecting a pressure of the hydraulic fluid 16 within the high pressure accumulator 18A. In a number of variations, predetermined minimum launch pressures and shift pressures may set and stored in the ECU 150. In a number of variations, if the hydraulic launch energy is exhausted, the hydraulic system 14 exits hydraulic launch mode, maintaining any reserve energy for the shift sequence (Step 326), described below.

In a number of variations, the shift sequence begins at Step 328. In a number of variations, signals sent from various sensors 85 may enable the ECU 150 to determine if a transmission 102 upshift is being initiated (Step 328). In a number of variations, thereafter, the hydraulic system 14 may determine if hydraulic energy is available (Step 330). In a number of variations, this may include accessing data stored after Step 326, where information regarding reserve energy may be stored after launch. In a number of variations, as indicated above, this step may include confirming a minimum required shift pressure is available from the high pressure accumulator 18*a*. In a number of variations, as engine torque is removed (due to disengagement of clutch), hydraulic torque may be ramped up (Step 332). In a number of variations, this may be accomplished by changing the displacement of the pump 60 by, in a number of variations, adjusting a swash plate 96 in the pump 60. In a number of variations, once the shift is complete (Step 334), hydraulic torque may be ramped out (again, by adjusting the pump swash plate 96 in a number of variations) as engine 112 torque may reestablished through engagement with the clutch 114 (Step 336). In a number of variations, if sensors 85 indicate that the speed limit for the axle 34 (or transfer gear set 124 and multiple-ratio gear set 97) low range is not yet reached (Step 338), the system 14 may return to Step 328, to await another upshift. In a number of variations, if the speed limit is exceeded, the rear differential (or transfer gear set 124 and multiple-ratio gear set 97) may be commanded to high range (Step 340). Thereafter, the system may return to Step 328 to await another upshift.

Figure 5:
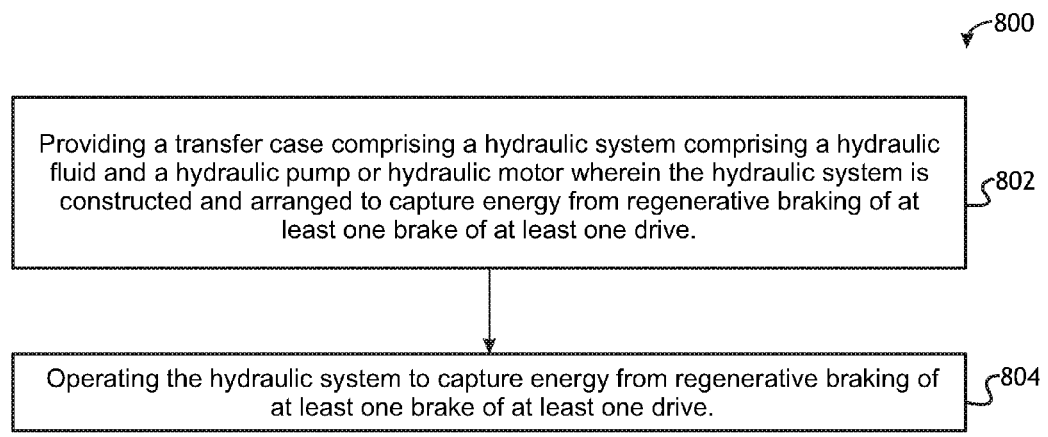
FIG. 5 is an illustration of a method according to a number of variations.

In a number of variations, as shown in FIG. 5, a method 800 is shown. In a number of variations, in step 802, the method 800 may include providing a transfer case 12 including a hydraulic system 14 including a hydraulic fluid 16 and a hydraulic pump or hydraulic motor 60 wherein the hydraulic system 14 may be constructed and arranged to capture energy from regenerative braking of the at least one brake 38 of at least one drive 30. In a number of variations, in step 804, the method 800 may further include operating the hydraulic system 14 to capture energy from regenerative braking of the at least one brake 38 of at least one drive 30. In a number of variations, the method 800 may further include wherein the transfer case 12 may be a component within a four or rear wheel drive for a vehicle 10. In a number of variations, the method 800 may further include wherein the transfer case 12 further includes an input member 50 driven by at least one output shaft 110*b* of at least one engine 112. In a number of variations, the method 800 may further include wherein the transfer case 12 further includes a first output member 40 adapted for driving the first drive 30A including at least one wheel 36 and at least one brake 38. In a number of variations, the method 800 may further include wherein the transfer case 12 further includes a second output member 42 adapted for driving a second drive 30B including at least one wheel 36B and at least one brake 38B. In a number of variations, the method 800 may further include wherein the transfer case 12 further includes an electrical storage system 80 including an electric generator 82 and a battery 84 operatively connected to at least one of the first output member 40 or the second output member 42. In a number of variations, the method 800 may further include wherein the transfer case 12 further includes a hydraulic system controller 150. In a number of variations, the method 800 may further include wherein the hydraulic system 12 further includes at least one accumulator 18. In a number of variations, the method 800 may further include wherein the at least one accumulator 18 includes at least one high pressure accumulator 18A and at least one low pressure accumulator 18B. In a number of variations, the method 800 may further include wherein the vehicle 10 may be a hydraulic hybrid vehicle.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising a transfer case comprising a hydraulic system comprising a hydraulic fluid, and a hydraulic pump or hydraulic motor wherein the hydraulic system is constructed and arranged to capture energy from regenerative braking of at least one brake of at least one drive.

Variation 2 may include a product as set forth in Variation 1 wherein the transfer case is a component within a four or rear wheel drive for a vehicle.

Variation 3 may include a product as set forth in any of Variations 1-2 wherein the transfer case further comprises an input member driven by at least one output shaft of at least one engine.

Variation 4 may include a product as set forth in any of Variations 1-3 wherein the transfer case further comprises a first output member adapted for driving the first drive comprising at least one wheel and at least one brake.

Variation 5 may include a product as set forth in any of Variations 1-4 wherein the transfer case further comprises a second output member adapted for driving a second drive comprising at least one wheel and at least one brake.

Variation 6 may include a product as set forth in any of Variations 1-5 wherein the transfer case further comprises an electrical storage system comprising an electric generator and a battery operatively connected to at least one of the first output member or the second output member.

Variation 7 may include a product as set forth in any of Variations 1-6 wherein the transfer case further comprises a hydraulic system controller.

Variation 8 may include a product as set forth in any of Variations 1-7 wherein the hydraulic system further comprises at least one accumulator.

Variation 9 may include a product as set forth in any of Variations 1-8 wherein the at least one accumulator comprises at least one high pressure accumulator and at least one low pressure accumulator.

Variation 10 may include a product as set forth in any of Variations 8-9 wherein the vehicle is a hydraulic hybrid vehicle.

Variation 11 may include a method including providing a transfer case comprising a hydraulic system comprising a hydraulic fluid and a hydraulic pump or hydraulic motor wherein the hydraulic system is constructed and arranged to capture energy from regenerative braking of the at least one brake of at least one drive; and operating the hydraulic system to capture energy from regenerative braking of the at least one brake of at least one drive.

Variation 12 may include a method as set forth in Variation 11 wherein the transfer case is a component within a four or rear wheel drive for a vehicle.

Variation 13 may include a method as set forth in any of Variations 11-12 wherein the transfer case further comprises an input member driven by at least one output shaft of at least one engine.

Variation 14 may include a method as set forth in any of Variations 11-13 wherein the transfer case further comprises a first output member adapted for driving the first drive comprising at least one wheel and at least one brake.

Variation 15 may include a method as set forth in any of Variations 11-14 wherein the transfer case further comprises a second output member adapted for driving a second drive comprising at least one wheel and at least one brake.

Variation 16 may include a method as set forth in any of Variations 11-15 wherein the transfer case further comprises an electrical storage system comprising an electric generator and a battery operatively connected to at least one of the first output member or the second output member.

Variation 17 may include a method as set forth in any of Variations 11-16 wherein the transfer case further comprises a hydraulic system controller.

Variation 18 may include a method as set forth in any of Variations 11-17 wherein the hydraulic system further comprises at least one accumulator.

Variation 19 may include a method as set forth in any of Variations 11-18 wherein the at least one accumulator comprises at least one high pressure accumulator and at least one low pressure accumulator.

Variation 20 may include a method as set forth in any of Variations 11-19 wherein the vehicle is a hydraulic hybrid vehicle.

Variation 21 may include a product or method as set forth in any of Variations 1-20 wherein the hydraulic fluid includes at least one of ATF, steam, fluorinol, ammonia, ethanol, methanol, kerosene, gasoline, diesel, propanol, butanol, water, benzene, toluene, methane, ethane, propane, butane, acetone, ethylene glycol, or liquid hydrogen.

Variation 22 may include a product or method as set forth in any of Variations 1-21 wherein the accumulator is bladder or piston spring type.

Variation 23 may include a product or method as set forth in any of Variations 1-22 wherein the vehicle includes a drivetrain including a transmission and an engine.

Variation 24 may include a product or method as set forth in any of Variation 23 wherein the transmission has a chain drive, belt drive, or traction drive mechanism.

Variation 25 may include a product or method as set forth in any of Variations 23-24 wherein the transmission includes a plurality of gear sets.

Variation 26 may include a product or method as set forth in any of Variations 23-25 wherein the transmission includes a main clutch which includes at least one of a plate-type clutch, or a dry clutch.

Variation 27 may include a product or method as set forth in any of Variations 1-26 wherein the first output member is driveably connected to at least one drive further comprising at least one at least one driveshaft, at least one axle shaft, or at least one differential mechanism.

Variation 28 may include a product or method as set forth in any of Variations 1-27 wherein the second first output member is driveably connected to at least one drive further comprising at least one of at least one driveshaft, at least one axle shaft, or at least one differential mechanism.

Variation 29 may include a product or method as set forth in of Variation 28 wherein the transfer case selectively transfers a portion of torque from the engine to at least one of the first output shaft or the second output shaft through a torque transfer unit which comprises a center differential.

Variation 30 may include a product or method as set forth in any of Variations 1-29 wherein transfer case is an M.S.O.F. or E.S.O.F. shift type.

Variation 31 may include a product or method as set forth in any of Variations 1-30 wherein the transfer case further comprises a multiple-ratio gear set comprising a plurality of additional gears allowing for hi range, neutral or low range operation.

Variation 32 may include a product or method as set forth in any of Variations 1-31 wherein the electrical storage system uses power from the hydraulic system to power various vehicle components comprising at least one component in the transmission, the transfer case, the drive, the cabin heater, the exhaust system, or the ECU.

Variation 33 may include a product or method as set forth in any of Variations 1-32 wherein the radiator is included in the product inside or connected to the fluid circuit to further provide heat transfer to or from the fluid.

Variation 34 may include a product or method as set forth in any of Variations 1-33 wherein the differential mechanism includes a high ratio gear, a low ratio gear, and at least one clutch to transfer power from the output member of the transfer case to the vehicle axle.

Variation 35 may include a product or method as set forth in any of Variations 1-34 wherein hydraulic system includes at least one valve.

Variation 36 may include a product or method as set forth in any of Variations 1-35 wherein valve comprises at least one of a ball valve, a butterfly valve, a ceramic disc valve, a check valve, a choke valve, a diaphragm valve, a gate valve, a globe valve, a knife valve, a needle valve, a pinch valve, a piston valve, a plug valve, a poppet valve, a spool valve, a thermal expansion valve, a pressure reducing valve, a sampling valve, or a safety valve.

Variation 37 may include a product or method as set forth in any of Variations 1-36 wherein the valves are operated by the ECU through use of a solenoid.

The above description of select variations within the scope of the invention is merely illustrative in nature and, thus, variations or variants thereof are not to be regarded as a departure from the spirit and scope of the invention.

What is claimed is:

1. A product comprising: a transfer case comprising a hydraulic system and an electrical storage system;
    wherein the electrical storage system comprises at least one of an electric generator or a battery; and wherein the hydraulic system comprises a hydraulic pump or hydraulic motor;
    wherein the hydraulic system is constructed and arranged to capture energy from regenerative braking of at least one brake of at least one drive.

2. A product as set forth in claim 1 wherein the transfer case is a component within a four or rear wheel drive for a vehicle.

3. A product as set forth in claim 1 wherein the transfer case further comprises an input member driven by at least one output shaft of at least one engine.

4. A product as set forth in claim 1 wherein the transfer case further comprises a first output member adapted for driving the first drive comprising at least one wheel and at least one brake.

5. A product as set forth in claim 1 wherein the transfer case further comprises a second output member adapted for driving a second drive comprising at least one wheel and at least one brake.

6. A product as set forth in claim 4 wherein the electrical storage system comprising an electric generator or a battery is operatively connected to at least one of the first output member or the second output member.

7. A product as set forth in claim 1 wherein the transfer case further comprises a hydraulic system controller.

8. A product as set forth in claim 1 wherein the hydraulic system further comprises at least one accumulator.

9. A product as set forth in claim 8 wherein the at least one accumulator comprises at least one high pressure accumulator and at least one low pressure accumulator.

10. A product as set forth in claim 1 wherein the vehicle is a hydraulic hybrid vehicle.

11. A method comprising:
providing a transfer case comprising a hydraulic system and an electrical storage system;
wherein the electrical storage system comprises at least one of an electric generator or a battery; and wherein the hydraulic system comprises a hydraulic pump or hydraulic motor;
wherein the hydraulic system is constructed and arranged to capture energy from regenerative braking of at least one brake of at least one drive; and
operating the hydraulic system to capture energy from regenerative braking of the at least one brake of at least one drive.

12. A method as set forth in claim 11 wherein the transfer case is a component within a four or rear wheel drive for a vehicle.

13. A method as set forth in claim 11 wherein the transfer case further comprises an input member driven by at least one output shaft of at least one engine.

14. A method as set forth in claim 11 wherein the transfer case further comprises a first output member adapted for driving the first drive comprising at least one wheel and at least one brake.

15. A method as set forth in claim 11 wherein the transfer case further comprises a second output member adapted for driving a second drive comprising at least one wheel and at least one brake.

16. A method as set forth in claim 14 wherein the electrical storage system comprising an electric generator or a battery is operatively connected to at least one of the first output member or the second output member.

17. A method as set forth in claim 11 wherein the transfer case further comprises a hydraulic system controller.

18. A method as set forth in claim 11 wherein the hydraulic system further comprises at least one accumulator.

19. A method as set forth in claim 18 wherein the at least one accumulator comprises at least one high pressure accumulator and at least one low pressure accumulator.

20. A method as set forth in claim 11 wherein the vehicle is a hydraulic hybrid vehicle.

* * * * *